US008753594B1

(12) United States Patent
Burba, III et al.

(10) Patent No.: US 8,753,594 B1
(45) Date of Patent: Jun. 17, 2014

(54) SORBENT FOR LITHIUM EXTRACTION

(75) Inventors: John L. Burba, III, Parker, CO (US);
Ray F. Stewart, Belmont, CA (US);
Brian E. Viani, Berkeley, CA (US);
Stephen Harrison, Benicia, CA (US);
Christine Ellen Vogdes, Sunnyvale, CA (US); John Galil Salim Lahlouh, San Jose, CA (US)

(73) Assignee: Simbol, Inc., Pleasanton, CA (US)

( * ) Notice: Subject to any disclaimer, the term of this patent is extended or adjusted under 35 U.S.C. 154(b) by 276 days.

(21) Appl. No.: 12/945,519

(22) Filed: Nov. 12, 2010

Related U.S. Application Data

(60) Provisional application No. 61/261,114, filed on Nov. 13, 2009.

(51) Int. Cl.
*C01D 15/00* (2006.01)

(52) U.S. Cl.
USPC .......................... 423/179.5; 423/181; 423/659

(58) Field of Classification Search
USPC ....................................... 423/659, 179.5, 181
See application file for complete search history.

(56) References Cited

U.S. PATENT DOCUMENTS

| | | |
|---|---|---|
| 3,306,700 A | 2/1967 | Neipert et al. |
| 4,116,856 A | 9/1978 | Lee et al. |
| 4,116,858 A | 9/1978 | Lee et al. |
| 4,159,311 A | 6/1979 | Lee et al. |
| 4,221,767 A | 9/1980 | Lee et al. |
| 4,291,001 A | 9/1981 | Repsher et al. |
| 4,347,327 A * | 8/1982 | Lee et al. ............... 521/28 |
| 4,348,295 A | 9/1982 | Burba, III |
| 4,348,296 A | 9/1982 | Bauman et al. |
| 4,348,297 A | 9/1982 | Bauman et al. |
| 4,376,100 A | 3/1983 | Lee et al. |
| 4,381,349 A | 4/1983 | Lee et al. |
| 4,405,595 A | 9/1983 | Yang et al. |
| 4,430,311 A | 2/1984 | Lee et al. |
| 4,461,714 A | 7/1984 | Burba, III |
| 4,472,362 A | 9/1984 | Burba, III |
| 4,477,367 A | 10/1984 | Burba, III |
| 4,540,509 A | 9/1985 | Burba, III |

(Continued)

FOREIGN PATENT DOCUMENTS

| | | |
|---|---|---|
| CN | 1558793 | 12/2004 |
| CN | 1558871 | 12/2004 |

(Continued)

OTHER PUBLICATIONS

Menzheres, L.T., et al., Solid-State Interaction of Aluminium Hydroxide with Lithium Salts, Journal of Materials Synthesis and Processing, 1999, pp. 239-244, vol. 7, No. 4, Plenum Publishing Corporation, US.

(Continued)

*Primary Examiner* — Melissa Stalder
(74) *Attorney, Agent, or Firm* — Bracewell & Giuliani LLP; Michael Samardzija

(57) ABSTRACT

This invention relates to a method for preparing a lithium aluminate intercalate (LAI) matrix solid and methods for the selective extraction and recovery of lithium from lithium containing solutions, including brines. The method for preparing the LAI matrix solid includes reacting aluminum hydroxide and a lithium salt for form the lithium aluminate intercalate, which can then be mixed with up to about 20% by weight of a polymer to form the LAI matrix.

18 Claims, 2 Drawing Sheets

(56) References Cited

U.S. PATENT DOCUMENTS

| | | | |
|---|---|---|---|
| 4,727,167 | A | 2/1988 | Burba, III et al. |
| 5,389,349 | A | 2/1995 | Bauman et al. |
| 5,599,516 | A | 2/1997 | Bauman et al. |
| 6,280,693 | B1 | 8/2001 | Bauman et al. |
| 7,504,036 | B2 * | 3/2009 | Gottlieb et al. ............... 210/688 |

FOREIGN PATENT DOCUMENTS

| | | |
|---|---|---|
| RU | 2009714 | 3/1994 |
| RU | 1729027 | 11/1994 |
| RU | 2050330 | 12/1995 |
| RU | 2157388 | 10/2000 |
| RU | 2193008 | 11/2002 |
| RU | 2232714 | 7/2004 |
| WO | 9419280 | 9/1994 |
| WO | 03041857 | 5/2003 |
| WO | WO 03041857 A1 * | 5/2003 |
| WO | 2009131628 | 10/2009 |

OTHER PUBLICATIONS

Ryabstev, A.D., et al., Sorption of Lithium from Brine onto Granular $LiCl\cdot 2Al(OH)_3\cdot mH_2O$ Sorbent under Dynamic Conditions, Russian Journal of Applied Chemistry, 2002, pp. 1069-1074, vol. 75, No. 7, RU.

* cited by examiner

SORBENT FOR LITHIUM EXTRACTION

RELATED APPLICATIONS

This application claims priority to U.S. Provisional Patent Application Ser. No. 61/261,114, filed on Nov. 13, 2009, which is incorporated herein by reference in its entirety.

BACKGROUND OF THE INVENTION

1. Technical Field of the Invention

The invention generally relates to the field of selectively removing and recovering lithium from solution. More particularly, the invention relates to methods and materials for the selective removal and recovery of lithium ions from a lithium ion containing brine, preferably without the substantial removal of other ions from the brine.

2. Description of the Prior Art

Approximately 75 to 80% of lithium chloride and lithium carbonate, and their derivatives, are currently produced from the recovery of lithium from brines, via natural evaporative processes. The invention described herein is applicable to these and other brine sources.

Geothermal brines are of particular interest for a variety of reasons. First, some geothermal brine provide a source of electrical power due to the fact that hot geothermal pools are stored at high pressure underground, which when released to atmospheric pressure, can provide a flash-steam. The flash-stream can be used, for example, to run a power plant. In some geothermal waters and brines, associated binary processes can be used to heat a second fluid, which can provide steam for the generation of electricity without the flashing of the geothermal brine. Additionally, geothermal brines contain various useful elements, which can be recovered and utilized for secondary processes.

It is known that geothermal brines can include various metal ions, particularly alkali and alkaline earth metals, as well as transition metals such as lead, silver and zinc, in varying concentrations, depending upon the source of the brine. Recovery of these metals is potentially important to the chemical and pharmaceutical industries. Typically, the economic recovery of metals from natural brines, which may vary widely in composition, depends not only on the specific concentration of the desired metal, but also upon the concentrations of interfering ions, particularly silica, calcium and magnesium, because the presence of the interfering ions will increase recovery costs as additional steps must be taken to remove the interfering ions.

As lithium has gained importance as an element for use in various applications, such as for use in batteries, research has been conducted to develop simple and inexpensive methods for the recovery thereof. For example, Burba previously developed two- and three-layer lithium aluminates for the recovery of lithium from brines. (See, for example, U.S. Pat. Nos. 4,348,295 and 4,461,714). The prior art methods that employ packed columns for the recovery, however, suffer from many drawbacks, such as shortened lifetimes due to the slow deterioration and disintegration of the particles.

Thus, there exists the need for the development of improved methods for the selective recovery of lithium from lithium containing brines that are easy to use, have a high capacity for the recovery of lithium, and have a long service life.

SUMMARY OF THE INVENTION

Methods for the selective removal of lithium from lithium containing solutions, such as brines, geothermal brines, salar (salt flat) brines, continental brines, including Smackover brines, oilfield brines, and high ionic strength solutions are provided herein. Also provided are methods for preparing sorbent compositions for the recovery of lithium from lithium containing solutions.

In one aspect, a method for preparing a composition for the recovery of lithium from a brine is provided. The method includes the steps of preparing a lithium aluminate intercalate solid by contacting a lithium salt with alumina under conditions sufficient to infuse the alumina with lithium salt, wherein the mole ratio of lithium to alumina is up to about 0.5:1; and mixing the lithium aluminate intercalate solid with a polymer material to form a matrix. The lithium aluminate intercalate solid is present in an amount of at least 80% by weight and the polymer is present in an amount of between about 1% and 20% by weight. In certain embodiments, the lithium salt is lithium chloride. In other embodiments, the lithium salt can be selected from the group consisting of lithium chloride, lithium bromide, lithium nitrate, or lithium hydroxide. In certain embodiments, the polymer is a solid or a powder. In certain embodiments, the alumina is selected from gibbsite, alumina hydrate, bayerite, nordstandite, bauxite, amorphous aluminum trihydroxide and activated alumina.

In another aspect, a composition for the recovery of lithium from a brine is provided. The composition includes particulate material that includes a lithium aluminate intercalate and a polymer. The lithium aluminate intercalate is produced by infusing alumina with a lithium salt to produce a LiX/Al(OH)$_3$ solid having a mole fraction of lithium to aluminum of up to 0.33, wherein X is the anion of the lithium salt. The lithium aluminate intercalate is present in an amount of at least about 80% by weight and the polymer is present in an amount of between about 1% and 20% by weight. In certain embodiments, the lithium salt is lithium chloride. In certain embodiments, the polymer is selected from the group consisting of polyethylene, ultra high molecular weight polyethylene, high density polyethylene, polypropylene, poly vinyl alcohol, poly acrylic acid, polyvinylidinedifluoride, polytetrafluoroethylene, and epoxy thermosets. In certain embodiments, the polymer comprises an emulsified water insoluble polymer. In certain embodiments, the water insoluble polymer comprises a fluoropolymer.

In another aspect, a method for the removal and recovery of lithium from geothermal brines is provided wherein the method includes the steps of: providing an extraction and recovery apparatus comprising a lithium aluminate intercalate matrix, wherein the matrix is prepared by the steps of contacting a lithium salt with alumina and hydrochloric acid under conditions sufficient to infuse the alumina with the lithium salt, wherein the mole ratio of lithium to alumina is up to about 0.5:1; and mixing the lithium aluminate intercalate solid with a polymer material to form a matrix, wherein said lithium aluminate intercalate solid is present in an amount of at least about 80% by weight and said polymer is present in an amount of between about 1% and 20% by weight. The method further includes the step of washing the matrix with at least 1 bed volume of a wash solution comprising at least about 50 ppm lithium and supplying a geothermal brine to the extraction and recovery apparatus and contacting said geothermal brine with the lithium aluminate intercalate matrix, wherein the contacting step is sufficient to extract lithium chloride from the geothermal brine. The method further includes monitoring the output of the extraction and recovery apparatus to determine the saturation of the lithium aluminate intercalate matrix; and recovering extracted lithium chloride by washing the lithium aluminate intercalate matrix with the wash solution. In certain embodiments, the lithium salt is lithium chloride.

DETAILED DESCRIPTION OF THE INVENTION

Figure 1:
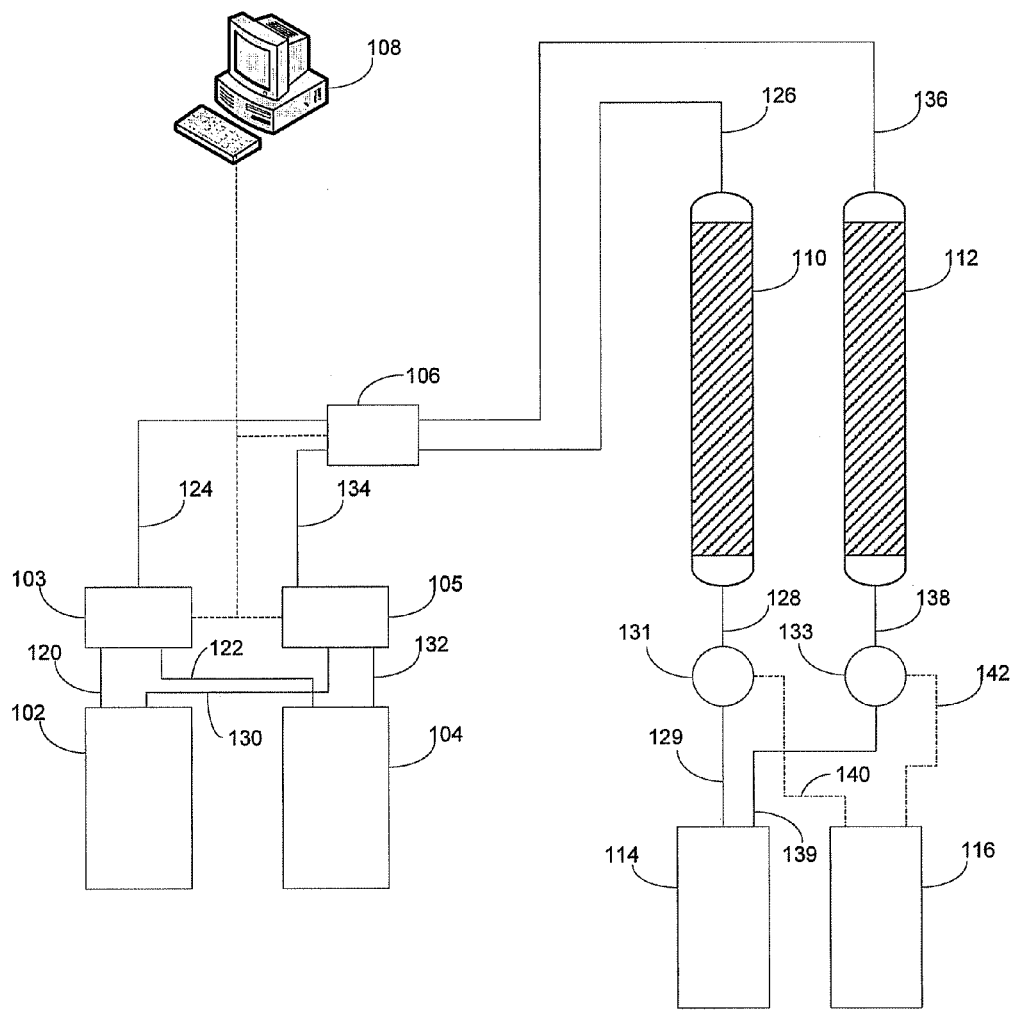
FIG. 1 is an illustration of one embodiment of the present invention.

Broadly, in one aspect, methods for the preparation of novel compositions of highly lithiated intercalates of lithium salts, including lithium chloride in an alumina hydrate for the extraction of lithium salts, particularly lithium halides, from solutions and brines that include said lithium salts, are described herein. As used herein, lithium salts include lithium nitrates, lithium sulfates, lithium bicarbonate, lithium halides (particularly chlorides and bromides), and acid salts. In addition, in another aspect, novel methods for the selective extraction of lithium halides from solutions and brines that include said lithium halides are described herein.

The present invention, in certain embodiments, provides an improved lithium aluminate intercalate (LAI) matrix for the removal and recovery of lithium from solutions, particularly geothermal and other brines. The presently described LAI matrix advantageously provides the maximum lithium to aluminum ratio, thereby providing increased capacity for removal and recovery of lithium. In certain embodiments, the LAI matrix has a mole fraction of lithium to aluminum of greater than about 0.3, preferably about 0.33. The higher ratio of lithium to aluminum maximizes the number of lithium sites available in the matrix for the loading and unloading of lithium from a brine solution. By producing a material that has the maximum lithium to aluminum ratio, the aluminum hydroxide substrate can then break down to fine particles, and will not exist as a single integral mass. The fine particles, which still retain a maximum lithium to aluminum ratio, can have an average diameter of less than about 80 µm, alternatively less than about 50 µm, alternatively less than about 25 µm, alternatively less than about 10 µm, alternatively less than about 5 µm. In certain embodiments, the particulate matter has a diameter of between about 0.1 and 10 µm, alternatively between about 0.5 and 8 µm, alternatively between about 1 and 5 µm. In certain embodiments, at least about 50% of the particulate matter has a diameter of less than about 2 µm, alternatively at least about 75% of the particulate matter has a diameter of less than about 2 µm, alternatively at least about 90% of the particulate matter has a diameter of less than about 2 µm. In certain embodiments, the particulate matter has a bimodal size distribution, wherein the material has a first peak distribution of about 50 µm and a second peak distribution of about 10 µm.

As used herein, brine solution can refer to a solution of alkali and/or alkaline earth metal salt(s) in water, wherein the concentration of salts can vary from trace amounts up to the point of saturation. Generally, brines suitable for the methods described herein are aqueous solutions that may include alkali metal or alkaline earth chlorides, bromides, sulfates, hydroxides, nitrates, and the like, as well as natural brines. Exemplary elements present in the geothermal brines can include sodium, potassium, calcium, magnesium, lithium, strontium, barium, iron, boron, silicon, manganese, zinc, aluminum, antimony, chromium, cobalt, copper, lead, arsenic, mercury, molybdenum, nickel, silver, gold, thallium, radon, cesium, rubidium, vanadium, sulfur, chlorine, and fluorine, although it is understood that other elements and compounds may also be present. Brines can be obtained from natural sources, such as, Chilean brines, Argentinean brines, Bolivian brines, or Salton Sea brines, geothermal brines, sea water, oilfield brines, mineral brines (e.g., lithium chloride or potassium chloride brines), alkali metal salt brines, and industrial brines, for example, industrial brines recovered from ore leaching, mineral dressing, and the like. The method is equally applicable to artificially prepared brine or salt solutions, as well as waste water streams, assuming that the salinity of the solution is high enough (for example, a minimum concentration of about 14% by weight common salt). It is understood that, in certain embodiments, the exact concentration of salt sufficient to drive to sorption of lithium into the lithium aluminate is dependent on the exact species and their concentrations present in the solution.

In certain embodiments, the present invention can be used in conjunction with means for first removing silica from the brine. For example, in certain embodiments, the present brines contemplated for use herein can be treated by known means, typically known as silica management, to first remove silica and/or iron, prior to the recovery of any lithium. In certain embodiments, the brine or lithium containing solution can be filtered or treated to remove solids or other elements present prior to the selective recovery of lithium.

As used herein, simulated brine refers to a synthetic brine prepared in an attempt to simulate the brine composition of various Hudson Ranch or other test well geothermal brines found in the Salton Sea (Calif., U.S.). Generally, the simulated brine has a composition of about 260 ppm lithium, 63,000 ppm sodium, 20,100 ppm potassium, 33,000 ppm calcium, 130 ppm strontium, 700 ppm zinc, 1700 ppm iron, 450 ppm boron, 54 ppm sulfate, 3 ppm fluoride, 450 ppm ammonium ion, 180 ppm barium, 160 ppm silicon (reported as silicon dioxide), and 181,000 ppm chloride. Additional elements, such as manganese, aluminum, antimony, chromium, cobalt, copper, lead, arsenic, mercury, molybdenum, nickel, silver, thallium, and vanadium, may also be present in the brine.

As noted previously, the lithium aluminate intercalate ("LAI") matrix is prepared by mixing a lithium aluminum intercalate ($LiCl:Al(OH)_3$) with a polymer or plastic material. Typically, the LAI matrix includes a major portion of a lithium aluminate intercalate (LAI), prepared according to known methods, and a minor portion that includes polymeric or plastic material that serves as a binder. In certain embodiments, the matrix includes at least 75% by weight of the LAI. In certain embodiments, the matrix includes at least 80% by weight of the LAI, and up to about 20% by weight of the plastic material. In alternate embodiments, the matrix includes at least about 85% by weight of the LAI and up to about 15% by weight of the plastic material. Alternatively, the matrix can include at least about 90% by weight of the LAI and up to about 10% by weight of the plastic material. In certain embodiments, the matrix includes between about 85-95% by weight of the LAI, and between about 5-15% by weight of the plastic material. In alternate embodiments, the matrix includes between about 88-94% by weight of the LAI, and between about 6-12% by weight of the plastic material. In an exemplary embodiment, the LAI matrix includes about 90% by weight LAI and about 10% by weight of the polymer or plastic material.

In certain embodiments, the matrix includes at least 75% by volume of the LAI. In certain embodiments, the matrix includes at least 80% by volume of the LAI, and up to about 20% by volume of the plastic material. In alternate embodiments, the matrix includes at least about 85% by volume of the LAI and up to about 15% by volume of the plastic material. Alternatively, the matrix can include at least about 90% by volume of the LAI and up to about 10% by volume of the plastic material. In certain embodiments, the matrix includes between about 85-95% by volume of the LAI, and between about 5-15% by volume of the plastic material. In alternate embodiments, the matrix includes between about 88-94% by volume of the LAI, and between about 6-12% by volume of the plastic material. In an exemplary embodiment, the LAI matrix includes about 90% by volume LAI and about 10% by volume of the polymer or plastic material.

The LAI can be prepared by known means, such as is described in U.S. Pat. No. 6,280,693 to Bauman, et al. Generally, in certain embodiments, the LAI can be prepared by contacting alumina pellets, lithium hydroxide, and water; and allowing the lithium hydroxide to infuse the alumina. In certain embodiments, the lithium hydroxide can be replaced with lithium salts, such as lithium chloride or other like lithium salts, and combinations thereof. Suitable sources of the alumina can include gibbsite, alumina hydrate, bayerite, nordstandite, bauxite, amorphous aluminum trihydroxide and activated alumina. The infusion can be a slow process that is typically completed in about 2-48 hours, although it is understood that the process can proceed at different rates, depending upon the exact conditions, such as temperature, used for the infusion process. Infusion is typically carried at or near room temperature, but can also be carried out at elevated temperatures up to about 125° C. (at pressures of less than about 5 atm). Following infusion of the lithium hydroxide into the alumina, the solution can then be neutralized by adding hydrochloric acid or other like acid, to achieve a pH of between about 5 and 7. When the acid used is HCl, the acidification of the solution produces $LiCl/2Al(OH)_3$. It is the intention to fracture the infused material, thereby generating a fine particulate matter, rather than an integral mass. In certain embodiments, the fine particulate matter has a diameter of less than about 80 µm, alternatively less than about 50 µm, alternatively less than about 25 µm, alternatively less than about 10 µm. In certain embodiments, the material has a bimodal size distribution wherein the material has a first peak distribution of about 50 µm and a second peak distribution of about 10 µm. In certain embodiments, the particulate material has a diameter of between about 0.1 and 8 µm, alternatively between about 0.5 and 5 µm. In certain embodiments, at least 50% of the particulate matter has a diameter of less than about 2 µm, alternatively at least about 75% of the particulate matter has a diameter of less than about 2 µm, alternatively at least about 90% of the particulate matter has a diameter of less than about 2 µm. In certain embodiments, the lithium hydroxide is added to the alumina in a molar ratio of between about 1:1 and 1:5, preferably between about 1:2 and 1:4. The finalized LAI matrix preferably has a stoichiometric composition of LiCl: $Al(OH)_3$ of between about 1:2 and 1:4, preferably between about 0.75:2 and 1:2. In certain embodiments, the LAI can be used as prepared. In alternate embodiments, the LAI can be used as a milled material using known techniques to mill the LAI. In yet other embodiments, the LAI can also be prepared by treating a milled alumina hydrate and with lithium hydroxide, followed by neutralization with acid. Generally, in contrast to similar prior art compositions which utilize integral polycrystalline compositions, the present invention preferably utilizes particulate LAI material, wherein the particulate matter can generally have any shape or size, and may have a diameter of less than about 100 µm, alternatively a diameter of less than about 50 µm. In certain embodiments, the particle size can be greater, for example, between 200 and 500 µm, or greater, and the resulting larger particles can then be reduced in size by grinding or by other procedure. The use of particles resulting from the grinding of larger particles, however, can in certain instances result in materials having a reduced capacity and a measurable gibbsite content.

The polymer or plastic binder material that makes up the matrix can be selected from any suitable thermoplastic or thermoset polymer material. Representative thermoplastic resins can include polyethylene (PE) (including ultra high molecular weight polyethylene (UHMWE), high density polyethylene (HDPE), and linear low density polyethylene (LLDPE)), as well as various ethylene co-polymers such as ethylene vinyl acetate, ethylene vinyl alcohol, ethylene vinyl chloride, ethylene co-acrylate, or similar materials, polypropylene (PP) and its copolymers, polymethyl pentene, polystryene, poly vinyl alcohol (PVA), poly acrylic acid (PAA), polyacrylamide (PAM), acrylic and methacrylic polymers, polycarbonate, polyacrylonitrile (PAN), polyvinylidinedifluoride (PVDF) homo or co-polymers, polytetrafluoroethylene (PTFE), and related fluoropolymers, polyurethanes, and polysiloxanes. Representative thermoset resins can include epoxy resins, phenolic resins, vinyl ester resins, one or two component methacrylic resins, melamine based resins, cross-linked polysiloxanes, or other plastic or polymeric materials that can function as suitable matrix materials. In one embodiment, the lithium aluminate matrix is prepared from a polymer that facilitates granulation. In another embodiment, the matrix polymer precursor is water based, such as a water soluble resin, an aqueous dispersion, or an emulsion. In certain embodiments, the plastic and polymeric materials are suitable for operation at temperatures in excess of about 90° C. Alternatively, the materials are suitable for operation at temperatures in excess of about 100° C. In yet other embodiments, the materials are suitable for operation at temperatures in excess of about 110° C. The polymer or plastic material can be added to the LAI material as a solid powder or pellet form and mixed together, or it can be added as a low or high viscosity fluid. Preferably, the LAI and the polymer or plastic material are thoroughly mixed together.

In certain embodiments, the polymer is an emulsified water insoluble polymer. In certain embodiments, the water insoluble polymer is a fluoropolymer. In certain embodiments, the water insoluble polymer is an acrylic interpolymer. In certain embodiments, the polymer can be a crosslinked polymer.

In certain embodiments, the polymer/plastic material and the LAI material can be mixed together and sintered at elevated temperature to form the LAI matrix. In certain embodiments, pressure can be applied to the mixture before, during, or after the sintering process. In certain embodiments, up to 10,000 psi can be applied to the mixture, with or without concurrent heating thereof. In certain embodiments, pressure of at least 2500 psi is applied. In alternate embodiments, increasingly greater pressures are applied to the mixture. The resulting sintered product is typically a solid, which can then be broken into smaller pieces, preferably to form a plurality of particulates, for use. Optionally, the solid sintered products can be ground to a desired particulate diameter or size. In certain embodiments, the ground LAI matrix can be separated, using for example sieves, to provide multiple sizes or ranges of diameters of the LAI matrix particles.

In one exemplary embodiment, an LAI matrix is prepared from a mixture that includes the LAI powder and a powdered polymer, which can be combined in a mixing vessel and thoroughly mixed. The resulting LAI powder and powdered polymer mixture can then be subjected to elevated temperature and/or pressures utilizing a hydraulic press, a roll mill, an extruder, or a high shear mixer. For example, in certain embodiments, the powder mixture can be subjected to pressures of at least 3000 psi, for a time period of at least 3 minutes. In certain other embodiments, the powder mixture can be subjected to increasing pressures, for example, the powder mixture can first be subjected to increasing pressures of at least 3000 psi, and up to about 10,000 psi. In one specific embodiment, the powder mixture is sintered, wherein the powder mixture subjected to a pressure of about 3000 psi for 1 minute, released, subjected to a pressure of about 4000 psi for a minute, released, subjected to a pressure of about 5000 psi for about 3 minutes, released, subjected to a pressure of about 10,000 psi for about 3 minutes, and released. In certain embodiments, during sintering, the press can be heated to a temperature of greater than 100° C., preferably greater than about 200° C., more preferably greater than about 300° C. It is preferred that the temperature during sintering be maintained at below about 250° C., which, in certain embodiments, is approximately the limit of the thermal stability of the LAI. The resulting solid sintered block or sheet can then be broken into large granules utilizing a hammer or like instrument to provide a variety of different sized particles. The resulting particles can then be sieved into various fractions, such as, a first fraction having a diameter of between about 300 and 450 µm, a second fraction having a diameter between about 180 and 300 µm, and a third fraction having a diameter of between about 100 and 180 µm. In certain embodiments, particles having a diameter of up to about 1000 µm can be used in accordance with the methods described herein, alternatively particles having a diameter of between about 200 and 800 µm, alternatively between about 200 and 500 µm, alternatively between about 500 and 800 µm.

In one embodiment, a water based polymer or polymer precursor is added to LAI powder in a high shear agglomerator, such that small particles are produced directly that may then be used as prepared, or can be further processed by drying and/or curing at elevated temperatures. In another embodiment, LAI powder is mixed with a polymer binder that includes one or more of an acrylic emulsion, a water soluble polymer, or an emulsion of an interpolymer of polyvinylidine fluoride and acrylic, optionally including at least one cross-linking agent, to form a viscous fluid or mass, which can then be formed into particles, sheets, strings, or other desired shapes, dried, cured, and optionally subjected to a granulating process.

In certain embodiments, the LAI-polymer matrix can be pressed in a mold to form any desired shape or size. In certain embodiments, the LAI-polymer matrix can be cured and formed as a sheet or like shape, suitable for use as, for example, a cartridge filter wherein a lithium containing solution is passed over and/or through the sheet for the extraction of the lithium containing ions.

In other embodiments, the LAI-polymer matrix can be pressed into a mold and cured to form a sheet or film that is permeable to lithium salts, but not porous to the solution. Such a sheet or film can be employed in a variety of ways to remove lithium from a brine. For example, in one embodiment, the lithium salt permeable sheet or film can be placed between two fluids, wherein the first fluid is a lithium containing solution or brine, and the second fluid is a low ionic strength solution. The lithium salts from the lithium containing solution or brine would be intercalated into the permeable sheet or film and would pass through to the low ionic strength solution on the other side of the sheet or film. Without wishing to be bound by any specific theory, it is believed that the lithium salts would pass through the sheet or film from the brine to the low ionic strength solution by a tunneling or like mechanism.

In certain embodiments, a lithium ion permeable sheet or film may prevent cross-contamination by other salts as only lithium salts can pass through the sheet or film.

In certain embodiments, the lithium ion permeable sheet or film can find other uses, for example, as a membrane for electrolysis or electrodialysis and therefore serve as a means of extraction and concentration.

The LAI-polymer matrix is preferably formed of particles having a diameter of between about 0.05 and 5 mm, preferably less than about 2.5 mm in diameter, and even more preferably between about 0.1 and 2 mm in diameter. In certain embodiments, the particles have a diameter of between about 0.1 and 0.5 mm. Alternatively, the particles have a diameter of between about 0.2 and 0.8 mm, alternatively between about 0.2 and 0.4 mm, alternatively between about 0.2 and 0.6 mm, alternatively between about 0.4 and 0.6 mm, or alternatively between about 0.6 and 0.8 mm.

In certain embodiments, other additives can be added to the matrix. For example, in one embodiment, a pore forming material can be added to the matrix material and then removed after matrix formation. Preferred pore forming materials can include water or alcohol soluble salts, such as calcium carbonate, lithium chloride, sodium chloride, sodium sulfate, sodium benzoate, organic materials such as polyvinyl alcohol, sugars, polyethylene oxide and copolymers, urea, calcium carbonate, and triacetin. In certain embodiments, a calcined diatomaceous earth and similar material may be added to the matrix to promote fluid flow and prevent compaction of the matrix and the resultant loss of permeability. These additives are generally added before, or during the sintering process.

Generally, during use, the LAI matrix prepared according to the above described process is washed with a predetermined amount of water to remove a portion of the LiCl from the matrix, thereby creating vacant sites that are available to receive lithium halides or other lithium salts from a brine or solution. For example, upon exposure to a solution or brine that includes lithium chloride, the LAI matrix can then accept lithium chloride ions. The initial wash water preferably includes at least a small concentration of LiCl. In certain embodiments, the wash water includes at least 100 ppm LiCl. In alternate embodiments, the wash water includes at least 150 ppm LiCl. In yet other embodiments, the wash water includes at least 200 ppm LiCl. In certain embodiments, the wash water may include a salt, such as NaCl, KCl, or any other salt or non-ionic solute that may be advantageous for a particular lithium salt extraction process. Typically, chlorides are selected due to their relatively low cost, however it is understood that other halides can also be used. In certain embodiments, divalent and trivalent salts are avoided.

After the vacant sites in the LAI matrix have been exposed by rinsing with the wash water, the vacant sites can then be loaded with "new" LiCl or other lithium salts by exposing the LAI matrix to the brine or solution that includes LiCl or other lithium salts. In certain embodiments, the brine or solution does not include salts that will compete with the extraction of lithium. As the LiCl in the brine or solution contact a vacant site, the lithium ions are captured by the LAI matrix and fill the exposed vacancies. After the LAI matrix is saturated with lithium salt, for example LiCl, the flow of the brine can be stopped. The captured LiCl can then be unloaded from the LAI matrix by again washing the LAI matrix with wash water. In certain embodiments, as noted with respect to the initial wash water above, the wash water includes a small amount of LiCl present, such as at least 100 ppm of lithium, sufficient to ensure that at least a portion of the capture sites on the LAI matrix are filled with ions to prevent the LAI matrix from collapsing. The process can be repeated many times, as desired The loading and unloading of the LAI matrix can be monitored by measuring the lithium concentration of the outlet of the column. Means for monitoring the concentration of the lithium can include ion selective electrodes, ion chromatography, or spectrometric analysis, such as atomic absorption or inductively coupled plasma spectroscopy, and other means known in the art. The loading process is typically fairly efficient, such that at least 50% of the lithium ions in the brine or solution are captured by the LAI matrix, preferably at least 90% of the lithium ions in the brine or solution are captured by the LAI matrix. As such, a rapid increase in the lithium ion concentration at the outlet of the LAI matrix is indicative of saturation of the column. Similarly, when recovering the lithium ions from the LAI matrix, as the process is proceeding and ions are being removed, a sudden decrease in the concentration thereof can be indicative of the removal of a majority of the ions captured by the matrix.

In certain embodiments, the LAI matrix prepared according to the present methods has an extraction capacity suitable for use in brines having a lithium concentration similar to that of the Hudson Ranch geothermal brines, i.e., a lithium concentration of about 260 ppm, of at least about 1 mg of lithium per gram of the LAI matrix, preferably at least about 1.5 mg of lithium per gram of the LAI matrix, even more preferably at least about 2 mg of lithium per gram of the LAI matrix. The extraction capacities would be larger for brines containing higher concentrations of lithium.

Referring now to FIG. 1, an exemplary laboratory apparatus for the capture and recovery of lithium ions from a solution or brine is provided. Apparatus 100 includes first vessel 102 for holding a wash (strip) solution and second vessel 104 for the brine or lithium containing solution. Solenoid valves 103 and 105 are connected to computer 108 and control the input of fluid, i.e., brine or wash solution. Apparatus 100 further includes digital peristaltic pump 106 (DPP). Computer 108 can be coupled to various instruments, such as DPP 106, and solenoid valves 103 and 105, and is also a component of apparatus 100. Apparatus 100 further includes first LAI matrix column 110 and second LAI matrix column 112. Wash liquids and excess brine are collected in bulk collection vessel 114, and lithium ion produced can be recovered in sequential aliquots in product collection fractionator 116. As is understood, apparatus 100 may also include various heat exchangers, valves, and filters, for the control of the process.

Apparatus 100 includes two columns, 110 and 112 respectively, which are preferably packed with the LAI matrix, typically as particulate matter, according to the present invention. It is understood that the apparatus can include a single column, or can include multiple columns. Glass wool, filters, or the like can be used at the top and bottom of the column to ensure that the LAI matrix, or fines thereof, are not washed out of the column. In operation, columns 110 and 112 are operated in parallel, although in certain embodiments the columns can be alternated such that while one column is being loaded, the second column is being unloaded.

For example, during the loading of first column 110, brine from vessel 104 is supplied via line 122 to solenoid valve 103, and can then be supplied via line 124 to DPP 106. The brine is then supplied from DPP 106 via line 126 to first column 110, where the brine contacts the LAI matrix, which is operable to remove lithium ions from said brine. Excess brine solution, and brine solution that has had lithium ions removed therefrom is recovered in collection vessel 114 via line 128.

Simultaneously, second column 112, which can be saturated with lithium ions, can be unloaded. Wash solution from vessel 102 can be supplied via line 130 to solenoid valve 105, and then supplied to DPP 106 via line 134. Wash solution is then supplied via line 136 to second column 112, where it contacts the LAI matrix and removes lithium ions saturated thereon. A wash solution that is rich in lithium, as compared with the wash solution contained in vessel 102, is recovered in product collection fractionator 116, via line 142.

As can be seen in FIG. 1, the operations of first and second columns 110 and 112 can be reversed and the first column can then be supplied with wash water for recovery of lithium ions and the second column can then be supplied with a brine solution for the removal of lithium therefrom.

Figure 2:
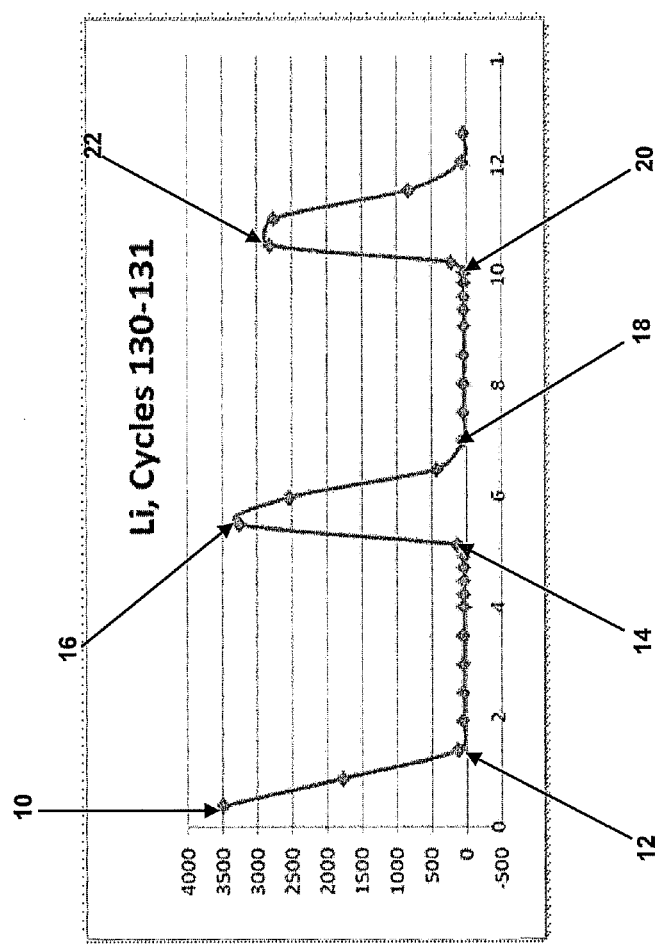
FIG. 2 is a graphical representation showing the loading and unloading of a column according to an embodiment of the present invention.

Referring now to FIG. 2, the performance of a column, as shown by the lithium concentration of the liquid exiting the column during the loading and unloading thereof, is provided. The column is loaded with approximately 9.4 cc of a granular LAI matrix having an average particle diameter of between about 0.18 and 0.3 mm consisting of approximately 95% by weight lithium aluminate intercalate and 5% by weight polyvinylidine fluoride to simulate the loading and unloading of the column. A water solution that includes between approximately 100 and 1,000 mg/L of lithium is used as the stripping solution for the LAI matrix bed.

During the loading step, approximately 4 bed volumes (i.e., approximately 40 mL, four times the volume of the column) of a simulated brine having a lithium concentration of between about 284 mg/L and about 332 mg/L were supplied to the column. The output stream from the column during loading unexpectedly had a lithium concentration of between about 10 and 50 mg/L, corresponding to the capture of between about 83% and 96% of the lithium present in the feed solution.

Unloading of the column is achieved by supplying approximately 2 bed volumes (i.e., approximately 20 mL) of a lithium strip solution (i.e., a solution having a LiCl concentration of approximately 6,000 mg/L). The output stream had a maximum LiCl concentration of about 21,000.

The loading and unloading of the column was repeated more than 500 times, with unexpectedly repeatable results for the capture of between about 83% and 96% of the LiCl present in the brine solution. Referring now to FIG. 2, the loading and unloading of the column is shown. (FIG. 2 shows cycles 130 and 131 of a total of 550 consecutive cycles of loading and unloading the column). The figure shows two full loading-unloading cycles, with lithium concentration of the liquid exiting the column in mg/L plotted on the Y-axis and bed volumes of liquid supplied to the column on the X-axis. Point 10 of FIG. 2 indicates the midpoint of an unloading cycle for the column. From point 10 to point 12 of FIG. 2, the brine (loading solution) is supplied to the column and is replacing the strip solution (unloading solution). Between points 12 and 14 of FIG. 2, the brine containing lithium is exiting the column. Between points 12 and 14 the concentration of lithium in the liquid exiting the column is relatively low, typically much less than the concentration of the strip solution. After point 14 of FIG. 2, the concentration of lithium exiting the column increases. At approximately 1 BV prior to point 14 of FIG. 2, the solution being fed to the column is switched from the lithium containing brine solution to stripping solution (having a lithium concentration of about 1000 mg/L) and a total of 1 to 1.5 BV is passed through the column.

At point 16 of FIG. 2, the strip solution is switched back to the lithium containing brine loading solution and another cycle begins.

Still referring to FIG. 2, at point 12, a lithium recovery cycle has been completed and the column is empty or only has negligible lithium content, and loading of the lithium begins. At approximately 1.5 BV prior to point 14, supply of the lithium containing brine solution to the column stops. At point 14, loading of the column with lithium has been completed, and removal of the captured lithium begins. At point 14 of FIG. 2, after approximately 1 bed volume of the "release" solution has been applied, the concentration of the lithium being removed from the column increases. At point 16, the concentration of the lithium salt in the "release" solution begins to decrease. At point 18 of FIG. 2, the column has been completely unloaded, and the loading cycle of the column begins again. After point 16, the column is again exposed to the brine solution for the capture of lithium ions. As the column is exposed to increasing volumes of the brine solution, the lithium is loaded onto the column. After complete loading of the column, at a point that is approximately 2 bed volumes of liquid before point 22 on FIG. 2, exposure to the brine solution is stopped and the "release" solution is applied to the column. At point 22, the lithium that had been retained on the column is released, as shown by the increased lithium production from the column. Thus, two "loading" and "unloading" cycles of the column have been shown.

In certain embodiments, the LAI matrix is capable of being loaded and unloaded at least 550 times without a noticeable decrease in the performance of the LAI matrix, wherein each linked loading and unloading of the column is referred to as a "cycle." Thus, in certain embodiments, the LAI matrix is capable of being cycled at least 250 times without noticeable decrease in the performance of the matrix, preferably at least 500 times without a noticeable decrease in the performance of the matrix, more preferably at least 1000 times without a noticeable decrease in the performance of the matrix. In certain embodiments, the performance of the LAI matrix, as measured by the amount of lithium that is loaded onto the column and subsequently released from the column does not vary by more than 10% over the course of the cycling of the matrix.

In certain embodiments, the LAI matrices prepared according to the methods described herein are capable of being cycled at least 3000 cycles without a noticeable decrease in the performance of the matrix, and in certain embodiments, at least about 6000 cycles without a noticeable decrease in the performance of the matrix. The unexpected increase in the lifetime of the materials provides a significantly greater lifetime of the material than that of prior art LAI material that do not utilize a polymer for the formation of the matrix.

In addition to demonstrating repeated loading and unloading of the LAI matrix, with consistent extraction and recovery of lithium, the pressure drop across the LAI matrix column was also studied. As is understood in the art, in certain embodiments, it can be advantageous to operate the extraction columns with as low a pressure drop as is possible. It has been demonstrated that a column that includes an extraction material that includes an LAI/polyvinylidine fluoride matrix displayed a pressure drop of less than about 15 psi/m of column bed over 550 loading and unloading cycles, which is less than the pressure drop typically exhibited by columns that include an LAI material that is not matrixed with a polymer material.

EXAMPLES

Example 1

In one embodiment, the lithium aluminate can be prepared as follows. To an appropriately sized metal or plastic container capable of being heated to a temperature of about 100° C. is added and mixed approximately 1 kg of unfractionated Alcoa aluminum trihydrate ($Al(OH)_3$) and $LiOH.H_2O$, in a ratio of approximately 2 moles of aluminum to approximately 1.05 moles of lithium, and about 0.8 kg of deionized water. The mixture is heated in an oven at a temperature of about 60° C. until the hydroxide concentration, as determined by titration, indicates that at least about 93% of the hydroxide present has reacted. The mixture is removed from heat, cooled to room temperature and approximately 0.8 kg of water is added to the mixture. The resulting mixture is then neutralized using hydrochloric acid over a period of at least 2 hours to achieve a pH of between about 6.5 and 7.5. The resulting solid is filtered and dried.

Example 2

Preparation of Particulate PVDF/LAI Matrix. Approximately 1.47 g of polyvinylidene fluoride copolymer (Kynarflex 2821) and approximately 27.56 g of the LAI powder (as prepared in Example 2, above) were placed in a plastic jar and mixed using a mechanical stirrer, at increasingly higher speeds, 1000-5000 rpm, over a period of about five minutes. The resulting mixed matrix powder was placed in a frame having two Teflon lined metal plates. The powder mixture in the press frame was placed in a hydraulic press and subjected to approximately 3500 psi pressure for approximately three minutes, released, subjected to approximately 4000 psi of pressure for approximately, released, subjected to approximately 5000 psi of pressure and a temperature of about 360° C. for approximately 3 minutes, released, subjected to approximately 10,000 psi of pressure and a temperature of about 360° C. for approximately 3 minutes, and released. The assembly was then subjected to approximately 3500 psi of pressure for about 2-3 minutes. The resulting sintered block was then broken into large granulates using a hammer. The resulting granulates were separated using sieves into three groups consisting of a first group having a diameter of between about 300 and 450 μm, a second fraction having a diameter between about 180 and 300 μm, and a third fraction having a diameter of between about 100 and 180 μm.

Example 3

Approximately 70 g of a 5% solution of polyvinyl alcohol ("PVA"; Mowiol 56-98) was added to approximately 1.4 g of a 10% glutaraldehyde solution and mixed for approximately 2 minutes. To the polyvinyl alcohol and glutaraldehyde solution was added approximately 70 g of a LAI prepared according to Example 2 having an average particle diameter of less about 180 μm and stirred with a Cowles blade at about 600 rpm for about 10-15 minutes, until the mixture thickens, yet is still flowable. To the mixture is added approximately 20 g of the same LAI to form a paste. Hydrochloric acid is added dropwise until the pH of the mixture is less than 3. Approximately 10 g of additional LAI is added without mixing to the acidified paste to form a stiff mixture. The mixture was dried at a temperature of about 85° C. in an open atmosphere.

The resulting mixture was ground until the matrix consisted of particles having a diameter of less about 600 μm. The resulting powder was sieved to remove any particulates having a diameter of less than about 100 μm, which were then reagglomerated with the polyvinyl alcohol and glutaraldehyde solution, as provided above. The additional steps noted above were repeated for the recoated LAI particles.

Example 4

The LAI/PVDF material from Example 2, sieved to approximately 180-300 μm, was washed with an approximately 26% solution of sodium chloride having a lithium concentration of approximately 200 ppm, loaded into a standard laboratory ion exchange column (co-current up flow, glass wool packed bed, having a bed volume of approximately 9.4 mL). The column was then subjected to 150 load and unload cycles.

The operating capacity of the media was determined to be approximately 2.9 g/L, and the pressure drop was measured to be 10 psi/m of linear length.

Example 5

The LAI-PVA material from Example 3, sieved to approximately 180-300 μm, was washed with an approximately 26% solution of sodium chloride having a lithium concentration of approximately 200 ppm, loaded into a standard laboratory ion exchange column (co-current up flow, glass wool packed bed, having a bed volume of approximately 9.4 mL). The column was then subjected to 129 load and unload cycles.

Operation of the loading and unloading was as described for Example 4.

The operating capacity of the media was determined to be approximately 3.5 mg/L, and the pressure drop was measured to be between about 100 and 160 psi/m of linear length.

Example 6

A solution was prepared by combining approximately 7.3 g of Johncryl 540 (BASF), 5 mL of deionized water and 1.5 g of Cymel 327 (Cytec). To this was added portion wise with mixing about 31 g of lithium aluminate having a particle size of less than about 180 microns. Additional water was added as required to maintain the material in plastic state. The resulting paste was extruded through a 425 micron screen and the dried at about 60° C. followed by curing at approximately 120° C. for approximately 4 hours. The cured extrudate was sieved to between about 425 and 800 microns. Extraction of the material in distilled water maintained at about 95° C. yielded approximately 22 mg of lithium per gram of material which was stable toward lithium cycling.

Example 7

Approximately 40 g of lithium aluminate, having a particle size less than about 180 microns, was added to a beaker and stirred with mixing blade at about 1000 RPM (tip speed approximately 2 m/sec). To the high shear mix was added about 9.6 grams of PVDF/acrylic emulsion (Kynar Aquatec RC-10,206 from Arkema Corporation), dropwise from a 10 mL syringe fitted with an 18 gage tip. The mixture was blended at about 1000 RPM with the addition of approximately 1-2 mL distilled water having about 200 ppm lithium ion until granules formed (about 10-20 minutes). The resulting material was dried overnight at about 85° C. and sieved. Approximately 7.5 g of a middle particle size distribution of agglomerates (having a particle diameter ranging from about 180 micron to about 850 micron) was packed into a 10 mm internal diameter jacketed chromatography column and tested for lithium elution at 85° C. The sample showed a net lithium extraction of approximately 2.5 mg per gram of media over two pore volumes of elution at about 0.3 mL/min.

Example 8

Microporous sheets that include approximately 10% by weight UHMWPE and approximately 90% by weight lithium aluminate intercalate (LAI) were prepared as follows. Approximately 4.7 g of UHMWPE (GUR 403) powder was combined with approximately 17.9 g of mineral oil (Hydrobrite 1000 PO) and heated at a temperature of about 135° C. for approximately 16 hours. The mixture was then heated for an additional 15 minutes at a temperature of approximately 140° C. The oil-polymer mixture was removed, cut into small pieces, and placed in a Brabender mixer at a temperature of about 200° C., and mixed at a speed of about 25 rpm for about 2 minutes. To the masticated oil-polymer mixture was added approximately 44 g of the LAI (prepared according to the procedure described in Example 1), 0.04 g ethylene bis-stearamide, 0.04 g Doverphos S-9228 (a phosphite antioxidant), and 0.02 g Irganox 1010 (a phenolic anti-oxidant). The mixture was mixed at about 45 rpm and a temperature of about 200° C., for approximately 3 minutes. The resulting mixture was collected, pressed into a frame having a thickness of approximately 0.01 inches, heated at a temperature of about 204° C. for approximately 1 minute under contact pressure from the top plate, pressed at a temperature of 204° C. and a pressure of about 5000 psi for approximately 1 minute, and is then pressed at a temperature of about 60° C. and pressure of about 3000 psi for approximately 2 minutes. The resulting pressed sheet was clamped at opposite edges and slowly stretched while being heated with a hot air gun until the length of the original sheet was stretched by approximately 50%. The stretched LAI-polymer matrix was immersed in ethyl acetate for approximately 16 hours to extract the mineral oil, rinsed with ethanol, air dried for approximately 5 minutes, and dried in an oven at approximately 70° C. for about 30 minutes.

Example 9

For comparison purposes, a resin based lithium sorbent was prepared according to the methods disclosed in U.S. Pat. Nos. 4,159,311; 4,348,296 and 4,430,311. A weak base anion exchange resin (Dowex Marathon WBA) in free base form was contacted with a saturated solution of $AlCl_3$ at a pH of about 0 and reacted at a temperature of between about 50 and 60° C. The reaction mixture was then titrated with concentrated $NH_4OH$ to raise the pH to approximately 7 and precipitate $Al(OH)_3$ in and onto the resin beads. Excess $Al(OH)_3$ and $NH_4Cl$ were removed by washing with water. The resin was heated at a temperature of between about 75 and 80° C. to convert the amorphous $Al(OH)_3$ into gibbsite, which served as a seed for subsequent precipitation. The gibbsite-seeded resin was reacted with sodium aluminate solution at a pH of about 13 and titrated with a 37% solution of HCl to lower the pH to approximately 7 and precipitate $Al(OH)_3$ on the gibbsite seed. The mixture was washed with water to remove excess NaCl and $Al(OH)_3$, and then heated to a temperature of between about 75 and 80° C. The gibbsite-loaded resin was reacted with LiOH at a pH of about 12 and a temperature of between about 55 and 60° C. to form a 3-layer polytype lithium aluminate ($LiAl_2(OH)_6OH$) within the resin. The resulting lithiated resin was then titrated with a 20% solution of HCl to a pH of about 7 to convert the hydroxide form of the lithium aluminate to the chloride form. Excess lithium aluminate and LiCl were removed by washing with water. The resulting resin contained between about 2 and 4 mmol of aluminum and between about 1 and 2 mmol of lithium per mL of resin.

Example 10

Comparative Examples

Extractions were performed using a variety of materials, which were then compared against a resin material prepared according to Example 9. A PVDF LAI-matrix was prepared according to Example 2, and sieved to produce three separate particle size groupings. Each separate sized grouping was then subjected to multiple loadings and unloadings of lithium chloride, as described herein. A first sample of the PVDF LAI-matrix having a particle size distribution (psd) of between about 75 and 180 μm was monitored for over 250 cycles of loading and unloading, and had a lithium recovery of between about 88 and 95%. A second sample of the PVDF LAI-matrix having a particle size distribution (psd) of between about 180 and 300 μm was monitored for over 450 cycles of loading and unloading, and had a lithium recovery of between about 83 and 97%. A third sample of the PVDF LAI-matrix having a particle size distribution (psd) of between about 300 and 425 μm was monitored for over 15 cycles of loading and unloading, and had a lithium recovery of between about 84 and 84%. As a comparison, the resin based material prepared according to Example 9 was tested, showing a recovery of between about 81 and 88%.

Example 11

Polymer/LAI agglomerates were prepared by first manually mixing approximately 24 mL of PU 442 polycarbonate/polyurethane resin (Picassian Polymers) with about 6 mL XL-702 (a polycarbodiimide crosslinker available from Picassian Polymers) and 45 mL of distilled water. Approximately 84 g of dried LAI particles (prepared according to the procedure described in Example 1) were added and mixed manually to provide a mixture that includes about 10.2% binder by weight. The mixture was then transferred to a Keyence Hybrid mixer HM-501 and mixed for a total of one minute (two 30 second mixes) to produce a paste that includes wet agglomerated particles. The paste was manually pressed through a 500 micron square opening screen while hot air was directed over the strands to prevent sticking. The resulting strands were collected and dried for approximately seventy-two hours in an oven maintained at a temperature of about 50° C., followed by curing for about two hours at approximately 120° C. The cured strands were then manually broken into shorter agglomerates on a 600 micron sieve. The broken strands were sieved in a stack of various size screens, having openings ranging from about 106 to 600 μm and various size fractions of agglomerated particles were collected separately and weighed. Agglomerates from the 425-600 μm fraction were further tested for operating capacity.

Polymer/LAI agglomerates described in Example 11 were loaded onto a column having a volume of about 10.6 mL and were loaded with about eight bed volumes (hereinafter, "BV") of a simulated brine prepared as described herein at a rate of about 8 BV/hour. The column was stripped with approximately 1.5 BV of a deionized water solution containing about 1000 ppm lithium at a rate of about 2.4 BV/hour. All test solutions were supplied by co-current upflow, and because these tests were accelerated by reducing the loading and stripping solution volumes, lithium saturation in the column effluent during loading was not observed (i.e., the lithium concentration in the column effluent never equaled the lithium concentration in the feed solution). Sample aliquots were collected after 100 cycles and the metals were analyzed with ICP. The differential pressure in the system increased after approximately 100 cycles and remained high for the remainder of the cycles, ranging between about 2 and 7 psi. Attempts to reduce the increased differential pressure, including clearing the tubing lines, replacing glass wool used to contain the bed, and ensuring feed concentrations maintained at levels suitable to prevent the precipitation of salts, proved unsuccessful. After approximately 300 cycles, fines were observed at the inlet (bottom) of the bed and were subsequently removed. The total bed volume loss over 600 cycles was approximately 10%. The lithium capacity on loading was generally unchanged over the 600 cycle test, ranging from between about 1.5 and 3.5 mg Li/mL polymer/LAI agglomerate sorbent.

In addition to capacity, the robustness of the material was tested by subjecting it to ultrasonic agitation for approximately 1 minute. Fines having a diameter of less than about 45 μm dispersed from the material as a result of the agitation were measured, and reported as the rate of fines released per joule of energy added. A value between about 0.2 to 0.3 mg fines released per joule of energy input (mg/J) is considered the upper acceptable limit, as above this value the potential risk of particle disaggregation during column operation is increased. The present sample yielded a fines release value of 0.50 mg/joule.

Example 12

Polymer/LAI agglomerates were prepared by first manually mixing about 14.5 g of Kynar Aquatec 10,206 fluoropolymer/acrylic resin (Arkema, Inc.) with approximately 3.3 g XL-702 (polycarbodiimide crosslinker available from Picassian Polymers) and about 35 mL of distilled water. Approximately 93 g of dried LAI particles (from Example 1) were added in two increments and mixed in a Keyence Hybrid mixer for about one minute (in two 30 second mixings) to produce a paste that includes wet agglomerated particles having a binder content of about 8.2% by weight. The paste was transferred to a Fuji Paudal KAR75 basket extruder equipped with a screen having 0.6 mm diameter holes and was extruded at maximum speed into strands in 60-70° C. in the presence of hot circulating air flow. Strands of the polymer/LAI agglomerate were collected and dried for two hours in an oven at a temperature of about 60° C., followed by curing for about two hours at a temperature of approximately 120° C. The cured strands were broken into shorter agglomerates by running in a Vorti-Siv shaker, equipped with a nylon brush and ceramic balls. The broken strands were then sieved in a stack of various size screens, ranging from about 106 to 850 μm, and the various size fractions of agglomerated particles were collected separately and weighed. Agglomerates from the 300-425 μm and 425-600 μm fractions were tested for operating capacity.

Polymer/LAI agglomerates described in Example 12 having a diameter of between about 300 to 425 μm were loaded onto a column having an internal volume of about 10.6 mL and were loaded with approximately 12 BV of a simulated brine prepared as described herein at a rate of about 8 BV/hour. The column was stripped with about 1.5 BV of a deionized water solution containing approximately 1000 ppm Li at a rate of about 2.4 BV/h. All test solutions were supplied by co-current upflow. Sample aliquots were collected after 100 cycles and the presence of metals was analyzed with ICP. Differential pressure across the bed remained low throughout the cycles, although pressure in the tubing increased several times due to sorbent particles bypassing the glass wool and collecting in the influent and effluent tubing. Fines were not observed, but bed volume decreased during the testing due to a sorbent loss of approximately 19% over a total of 1300 cycles. The lithium capacity during loading ranged from about 2.3 mg Li/mL sorbent at the beginning of testing to about 1.7 mg Li/mL sorbent after approximately 1300 cycles of loading and unloading of the column. Corrections for bed loss were made in determining sorbent capacity calculations.

Mechanical robustness of the sorbent material was tested as described in Example 11. Samples prepared according to Example 12 yielded fines release values of about 0.17 mg/J and 0.10 mg/J, for the 300-425 and 425-600 µm fractions, respectively.

Example 13

A 14 L capacity high shear granulator from Lancaster (K-Lab) was fitted with a pressure sprayer to introduce the binder/water solution uniformly and rapidly to the powder mixture. Approximately 6000 g of dried LAI prepared according to Example 1 (above) was introduced into the Lancaster mixer and sheared until all large lumps were broken up. Approximately 100 g of distilled water was introduced and allowed to mix and thoroughly wet the polymer/LAI powder. A mixture of about 1191 g of Kynar Aquatec 10,206 fluoropolymer/acrylic resin (Arkema, Inc.), approximately 271 g XL-702 (a polycarbodiimide crosslinker available from Picassian Polymers), and about 1470 g of distilled water were blended and introduced to the mixer stepwise over a period of 7 minutes at maximum pan speed and maximum blade speed (about 40 RPM and 3000 RPM, respectively). During this process, about 30% of the agglomerates produced had an average diameter of greater than about 850 µm. The wet agglomerated mixture was passed through the Vorti-Siv equipped with an 850 µm screen using ceramic balls. The resulting material was then passed through 600 µm screen on the Vorti-Siv with ceramic balls and then dried at a temperature of about 60° C., followed by curing at a temperature of about 120° C. This resulted in a final distribution where 80% of material fell in range of about 180 to 600 µm, suitable for operational capacity testing.

The mechanical robustness of particles prepared according to Example 13 having diameters ranging from about 106-180 µm, 180-300 µm, and 300-425 µm were tested, yielding sample fines release values of about 0.22 mg/J, 0.25 mg/J, and 0.27 mg/J, respectively.

Example 14

A large scale method for the preparation of LAI particulate material for use herein is provided. Approximately 20 gal of water was added to the reactor and heated to about 95° C. Approximately 17.1 kg of LiOH.H$_2$O was added to the water and agitated until dissolved. To the mixture was added about 57.7 kg of Al(OH)$_3$. The resulting mixture of lithium and aluminum compounds was heated to between about 85-90° C. for at least about 4 hours. Water was added, as necessary, to maintain a constant water content. Reaction progress was monitored by titrating samples from the reaction and after the reaction was determined to be at least 92% complete, the reaction was slowly neutralized with 6N HCl over 1 hour to provide a pH of between about 6.5 and 7. A metering pump was used to titrate for up to about 4 hours to provide a stable pH of between about 6.5 and 7, ensuring that the pH is greater than 6. The water and supernatant are removed and the resulting solid material is dried in an oven. The yield was about 80 kg (90%) providing LAI particles having a bimodal distribution of about 100-125 µm and about 10 µm, as determined with a Microtrac Laser Diffration Type Analyzer. The free flow bulk density was about 0.6 g/mL and the tapped bulk density was about 0.8 g/mL.

Example 15

An alternate route to preparing the LAI materials for use herein according to a dry process that includes mixing approximately 16 kg Al(OH)$_3$ and about 17.1 kg LiOH.H$_2$O in a reactor until the dry materials are thoroughly mixed and adding to the mixture approximately 16.3 L of water, and the mixture was heated to a temperature of between about 85 and 90° C. and continuously stiffed for at least 4 hours. Reaction progress was monitored by titrating samples from the reaction and after the reaction was determined to be at least 92% complete, the reaction was slowly neutralized with a solution containing 31% by weight HCl over a period of about 2 hours to provide a pH of between about 5.5 and 7.5. A metering pump was used to titrate for up to about 4 hours to provide a stable pH of between of greater than 5.5. The water and supernatant are removed by heating the reactor to a temperature of about 110° C. until at least 90% of the moisture has been removed, and the resulting solid material is dried in an oven. The yield was about 23 kg (90%) providing LAI particles having diameter of less than of about 1 µm, as determined with a Microtrac Laser Diffraction Type Analyzer. The free flow bulk density was about 0.83 g/mL and the tapped bulk density was about 1 g/mL.

As is understood in the art, not all equipment or apparatuses are shown in the figures. For example, one of skill in the art would recognize that various holding tanks and/or pumps may be employed in the present method.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these reference contradict the statements made herein.

As used herein, recitation of the term about and approximately with respect to a range of values should be interpreted to include both the upper and lower end of the recited range.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

We claim:

1. A method for preparing a composition for recovery of lithium from a brine, wherein the method comprises the steps of:
preparing a lithium aluminate intercalate solid by contacting a lithium salt with alumina under conditions sufficient to infuse the alumina with lithium salt, wherein the mole ratio of lithium to alumina is up to about 0.5:1; and
mixing the lithium aluminate intercalate solid with a polymer material in an aqueous medium to form a matrix, wherein said lithium aluminate intercalate solid is present in an amount of at least about 80% by weight and said polymer is present in an amount of between about 1% and 20% by weight, and wherein the said polymer is not an ion-exchange resin.

2. The method of claim 1, wherein the lithium salt is lithium chloride.

3. The method of claim 1, wherein the matrix is sintered to form a solid.

4. The method of claim 3, wherein sintering the matrix comprises subjecting the matrix to pressure of at least 5000 psi and heating the matrix to a temperature of at least about 200° C.

5. The method of claim 1, wherein the alumina is selected from gibbsite, alumina hydrate, bayerite, nordstandite, bauxite, amorphous aluminum trihydroxide, and activated alumina.

6. A method for preparing a composition for recovery of lithium from a brine, wherein the method comprises the steps of:
preparing a lithium aluminate intercalate solid by contacting a lithium salt with alumina under conditions sufficient to infuse the alumina with lithium salt, wherein the mole ratio of lithium to alumina is up to about 0.5:1; and
mixing the lithium aluminate intercalate solid with a polymer material in an aqueous medium to form a matrix, wherein said lithium aluminate intercalate solid is present in an amount of at least about 80% by weight and said polymer is present in an amount of between about 1% and 20% by weight, and wherein the said polymer is selected from the group consisting of polyethylene, ultra high molecular weight polyethylene, high density polyethylene, polypropylene, poly vinyl alcohol, poly acrylic acid, polyvinylidinedifluoride, and polytetrafluoroethylene.

7. The method of claim 6, wherein the lithium salt is lithium chloride.

8. The method of claim 6, wherein the matrix is sintered to form a solid.

9. The method of claim 8, wherein sintering the matrix comprises subjecting the matrix to pressure of at least 5000 psi and heating the matrix to a temperature of at least about 200° C.

10. The method of claim 6, wherein the alumina is selected from gibbsite, alumina hydrate, bayerite, nordstandite, bauxite, amorphous aluminum trihydroxide, and activated alumina.

11. A composition for recovery of lithium from a brine comprising particulate material comprising a lithium aluminate intercalate and a polymer,
wherein the lithium aluminate intercalate is produced by infusing alumina with a lithium salt to produce a LiX/Al(OH)$_3$ solid having a mole fraction of lithium to alumina of up to about 0.33, wherein X is the anion of the lithium salt,
wherein the lithium aluminate intercalate is present in an amount of at least about 80% by weight and the polymer is present in an amount of between about 1% and 20% by weight, and
and wherein the said polymer is not an ion-exchange resin.

12. The composition of claim 11 wherein the lithium salt is lithium chloride.

13. The composition of claim 11 wherein the polymer is selected from the group consisting of polyethylene, ultra high molecular weight polyethylene, high density polyethylene, polypropylene, poly vinyl alcohol, poly acrylic acid, polyvinylidinedifluoride, and polytetrafluoroethylene.

14. The composition of claim 11 wherein the polymer comprises an emulsified water insoluble polymer.

15. The composition of claim 14 wherein the emulsified water insoluble polymer comprises a fluoropolymer.

16. The composition of claim 14 wherein the emulsified water insoluble polymer is an acrylic interpolymer.

17. The composition of claim 11 wherein the particulate material has an average diameter of between about 100 and 450 μm.

18. The composition of claim 11 wherein the particulate material has an average diameter of between about 180 and 300 μm.

* * * * *